United States Patent
Yin et al.

(10) Patent No.: US 9,328,859 B2
(45) Date of Patent: *May 3, 2016

(54) ISOCYANATE-BASED POLYMER FOAM COMPOSITE WITH IMPROVED THERMAL INSULATION PROPERTIES

(75) Inventors: Yige Yin, Shanghai (CN); Jing G. Chen, Shanghai (CN); Beilei Wang, Shanghai (CN); Li Ye, Suzhou (CN); Vanni Parenti, Campagnola (IT)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/234,067

(22) PCT Filed: Jul. 26, 2011

(86) PCT No.: PCT/CN2011/077635
§ 371 (c)(1),
(2), (4) Date: Jan. 21, 2014

(87) PCT Pub. No.: WO2013/013391
PCT Pub. Date: Jan. 31, 2013

(65) Prior Publication Data
US 2014/0151593 A1 Jun. 5, 2014

(51) Int. Cl.
| | |
|---|---|
| C08K 3/16 | (2006.01) |
| C08K 9/04 | (2006.01) |
| C08G 18/76 | (2006.01) |
| C08G 18/48 | (2006.01) |
| F16L 59/02 | (2006.01) |
| C08K 9/02 | (2006.01) |
| B29C 44/28 | (2006.01) |
| C08G 18/65 | (2006.01) |
| C08G 101/00 | (2006.01) |
| B29L 23/00 | (2006.01) |

(Continued)

(52) U.S. Cl.
CPC .............. *F16L 59/028* (2013.01); *B29C 44/28* (2013.01); *C08G 18/4816* (2013.01); *C08G 18/7664* (2013.01); *C08K 3/16* (2013.01); *C08K 9/02* (2013.01); *B29K 2075/00* (2013.01); *B29K 2105/045* (2013.01); *B29K 2105/046* (2013.01); *B29L 2009/00* (2013.01); *B29L 2023/225* (2013.01); *C08G 2101/005* (2013.01); *C08G 2101/0025* (2013.01)

(58) Field of Classification Search
None
See application file for complete search history.

(56) References Cited

U.S. PATENT DOCUMENTS 4,134,610 A * 1/1979 Lindewall .................. 293/109
4,795,763 A   1/1989 Gluck et al.
(Continued)

FOREIGN PATENT DOCUMENTS

JP          09169917 A    *   6/1997

OTHER PUBLICATIONS

Machine Translation of JP 09-169917A. Jun. 30, 1997.*
(Continued)

*Primary Examiner* — Robert C Boyle
*Assistant Examiner* — Stephen Rieth

(57) ABSTRACT

This invention relates to rigid isocyanate-based polymer foam and composites thereof comprising a carbon black component comprising at least 50 weight percent of a fluorinated carbon black. Said foam having improved thermal properties, specifically, rigid polyurethane and/or polyisocyanurate foams for use in said insulation applications.

8 Claims, 1 Drawing Sheet

(51) Int. Cl.
*B29K 105/04* (2006.01)
*B29K 75/00* (2006.01)
*B29L 9/00* (2006.01)

(56) References Cited

U.S. PATENT DOCUMENTS

| | | | |
|---|---|---|---|
| 5,192,607 A | | 3/1993 | Soukup |
| 5,373,026 A | | 12/1994 | Bartz et al. |
| 5,719,199 A | * | 2/1998 | Wallace et al. ............ 521/82 |
| 5,889,067 A | * | 3/1999 | Jang et al. ............ 521/117 |
| 6,067,430 A | * | 5/2000 | Mammino et al. ............ 399/174 |
| 2003/0008098 A1 | * | 1/2003 | Yuan et al. ............ 428/58 |

OTHER PUBLICATIONS

Making Polyurethanes. Polymer Science Learning Center, Department of Polymer Science, The University of Southern Mississippi. http://www.pslc.ws/macrog/uresyn.htm. As viewed on Jul. 15, 2014.*

Quantochrome Instruments Website. http://www.quantachrome.com/density/ultra_foam.html. As viewed on Feb. 26, 2010.*

Smooth-On Website. http://www.smooth-on.com/Documents-Duromete/c1351_1370/index.html. As viewed on Jan. 7, 2015.*

Written Translation of Paragraphs 5-7 of JP 09-169917A. Jun. 30, 1997.*

* cited by examiner

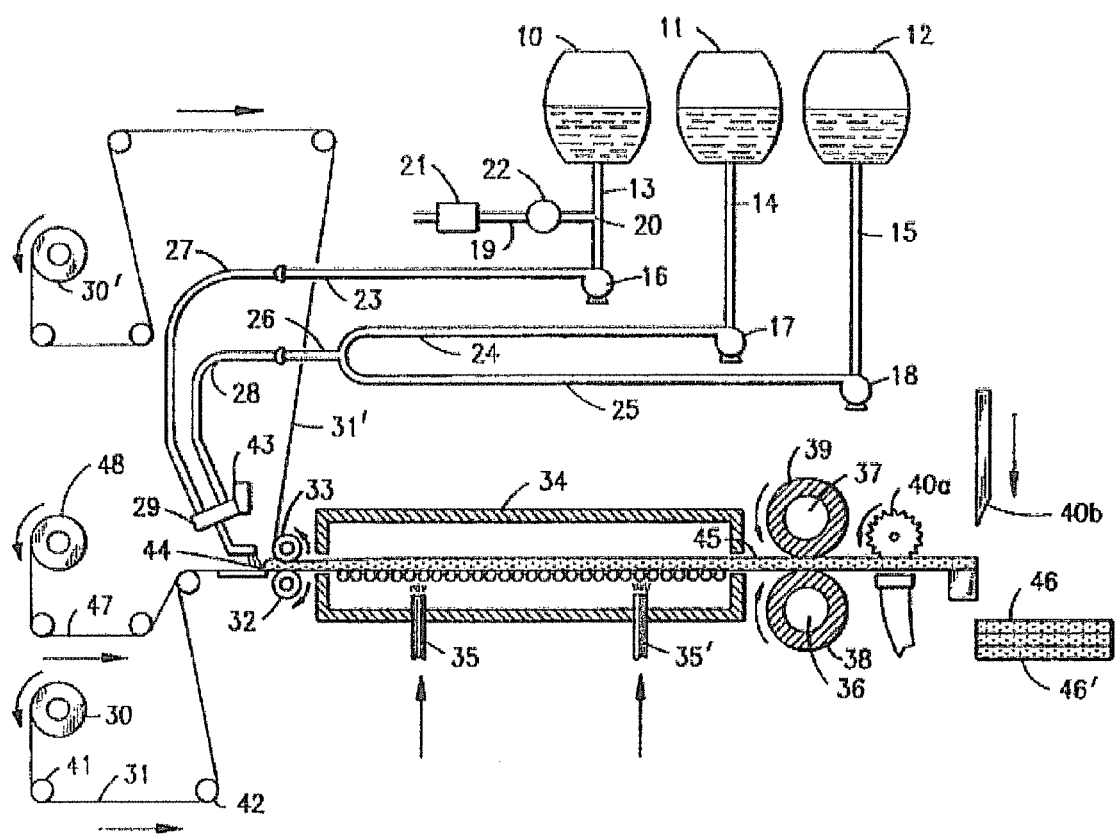

ISOCYANATE-BASED POLYMER FOAM COMPOSITE WITH IMPROVED THERMAL INSULATION PROPERTIES

FIELD OF THE INVENTION

This invention relates to rigid isocyanate-based polymer foams and composites thereof, said foams comprising fluorinated carbon black having improved thermal properties, specifically, rigid polyurethane and/or polyisocyanurate foams for use in insulation applications and methods to make said foams and composites.

BACKGROUND OF THE INVENTION

The use of carbon black to reduce the aged k-factor and hence improve the insulation value of closed cell, rigid, polymer foams is disclosed in U.S. Pat. Nos. 4,795,763; 5,192,607; and 5,373,026, which are incorporated by reference herein in their entirety. These patents establish that uniformly dispersed carbon black filler effects a significant permanent reduction in the aged k-factor of foams. A failure to properly disperse the carbon black and stabilize the dispersion can result in clogging of the foam production equipment and the production of foam wherein the carbon black is clustered at the foam cell struts or highly agglomerated in a portion of the cell walls to yield little or no improvement in insulation value. It is accordingly highly desirable to find ways to simply and economically disperse carbon black in the ingredients employed in foam production and stabilize the dispersion, and thereafter form highly insulating foams from the dispersed mixture.

SUMMARY OF THE INVENTION

The present invention accordingly provides a composite comprising a least one substrate in contact with a rigid isocyanate-based polymer foam made from a reactive formulation comprising a mixture of: (A) an A-side comprising: (i) an organic isocyanate; (B) a B-side comprising: (ii) an isocyanate-reactive component, (iii) a blowing agent, and (iv) one or more additional component selected from a catalyst, a nucleating agent, a surfactant, a crosslinker, a chain extender, a flame retardant, a filler, a colorant, a pigment, an antistatic agent, reinforcing fibers, an antioxidant, a preservative, an infrared blocking agent, or an acid scavenger, and (C) from 3 to 7 parts carbon black comprising from 50 to 100 percent by weight of (v) a fluorinated carbon black having a fluorine to carbon (F/C) molar ratio of at least 10/90, wherein parts by weight are based on the weight of the B-side component (B) and component (C) may be in either wholly in the A-side (A), wholly in the B-side (B), or a portion in the A-side and a portion in the B-side.

One embodiment of the present invention is the composite described herein above wherein the organic isocyanate is 2,4-toluene diisocyanate (TDI), 2,6-toluene diisocyanate, or mixtures thereof; 2,4'-diphenylmethane diisocyanate (MDI), 2,2'-diphenylmethane diisocyanate, 4,4'-diphenylmethane diisocyanate, or mixtures thereof; mixtures of diphenylmethane diisocyanates and oligomers thereof having an isocyanate functionality greater than 2 known in the art as "crude" or polymeric MDI; or MDI comprising urethane, allophanate, urea, biuret, carbodiimide, uretonimine and/or isocyanurate groups.

Another embodiment of the present invention is the composite described herein above wherein the isocyanate-reactive component is a polyol having a functionality of from 2 to 8 and a hydroxyl number of from 100 and 850.

Another embodiment of the present invention is the composite described herein above wherein the blowing agent is a physical blowing agent, a chemical blowing agent, or mixture thereof.

A preferred embodiment of the present invention is the composite described herein above wherein the carbon black component (C) is 100 percent fluorinated carbon black (v).

A preferred embodiment of the present invention is the composite described herein above wherein the fluorinated carbon black has an average particle size of from 5 nm to 500 nm.

A preferred embodiment of the present invention is the composite described herein above wherein said foam has a k-factor determined according to ISO 12939-01 such that the k-factor of the foam is at least 0.2 mW/mK below the k-factor of a corresponding foam prepared from the same foam-forming composition except that the fluorinated carbon black is omitted.

Another embodiment of the present invention is a process for producing a composite comprising the steps of:
(I) contacting at least one substrate with a mixture of a rigid isocyanate based polymer reactive formulation comprising:
  (A) an A-side comprising
    (i) an organic isocyanate,
  (B) a B-side comprising:
    (ii) an isocyanate-reactive component,
    (iii) a blowing agent,
    and
    (iv) one or more additional component selected from a catalyst, a nucleating agent, a surfactant, a crosslinker, a chain extender, a flame retardant, a filler, a colorant, a pigment, an antistatic agent, reinforcing fibers, an antioxidant, a preservative, an infrared blocking agent, or an acid scavenger,
  and
  (C) from 3 to 7 parts carbon black comprising
    (v) from 50 to 100 percent by weight of a fluorinated carbon black having a fluorine to carbon (F/C) molar ratio of at least 10/90, wherein parts by weight are based on the weight of the B-side component (B) and component (C) may be in either wholly in the A-side (A), wholly in the B-side (B) or a portion in the A-side and a portion in the B-side.
(II) subjecting the resulting reactive formulation to conditions sufficient to cure the reactive formulation to form a rigid isocyanate-based polymer foam contacting at least one substrate forming a composite comprising a rigid isocyanate-based polymer foam.

BRIEF DESCRIPTION OF THE DRAWINGS

FIG. 1 is a side schematic elevation of an apparatus suitable for producing a composite comprising a rigid isocyanate-based polymer foam in accordance with the present invention.

DETAILED DESCRIPTION OF THE EMBODIMENTS

The rigid isocyanate-based polymer foams according to the present invention are prepared from a reactive formulation comprising an A-side (A) comprising one or more organic isocyanate (i) and a B-side (B) comprising one or more isocyanate-reactive component (ii), a blowing agent (iii), and optionally one or more additive (iv), and a fluorinated carbon black (C).

Suitable organic isocyanates (i) for use in the composition and process of the present invention include any of those known in the art for the preparation of polyurethane foams, like aliphatic, cycloaliphatic, araliphatic and, preferably, aromatic isocyanates, such as toluene diisocyanate in the form of its 2,4 and 2,6-isomers and mixtures thereof and diphenylmethane diisocyanate in the form of its 2,4'-, 2,2'- and 4,4'-isomers and mixtures thereof, the mixtures of diphenylmethane diisocyanates (MDI) and oligomers thereof having an isocyanate functionality greater than 2 known in the art as "crude" or polymeric MDI (polymethylene polyphenylene polyisocyanates), the known variants of MDI comprising urethane, allophanate, urea, biuret, carbodiimide, uretonimine and/or isocyanurate groups.

Preferably monomeric MDI, crude MDI, polymeric MDI, combinations thereof, and/or liquid variants thereof are obtained by introducing uretonimine and/or carbodiimide groups into said polyisocyanates, such a carbodiimide and/or uretonimine modified polyisocyanate having an NCO value of from 29 to 33 percent and includes 1 to 45 percent by weight of 2,4'-diphenylmethane diisocyanate in the form of a monomer and/or a carbodiimidization product thereof. For a good description of such carbodiimide and/or uretonimine modified polyisocyanates see U.S. Pat. No. 6,765,034, which is incorporated by reference herein in its entirety.

In the present invention, the organic isocyanate component may include one or more organic polyisocyanate, in addition to and/or in place of monomeric MDI as needed, provided other polyisocyanate compounds do not have adverse influences on the performance on the desired sound deadening, vibration management, and flame resistance properties of the rigid isocyanate-based polymer foam. Typical examples of such other polyisocyanate compounds include isocyanate-terminal prepolymers which are formed by a reaction between at least one of compounds of the above-indicated monomeric MDI, and suitable active hydrogen compounds. To improve the formability and other characteristics of the obtained foam, the other polyisocyanate compounds may be selected from among organic isocyanates such as tolylene diisocyanate (TDI), isopholone diisocyanate (IPDI) and xylene diisocyanates (XDI), and modifications thereof. These isocyanates may be used in combinations of two or more types. Most preferably polyisocyanates are used which have an average isocyanate functionality of 2.1 to 3.0 and preferably of 2.2 to 2.8.

The amount of polyisocyanate that is used to make resilient flexible foam typically is sufficient to provide an isocyanate index of from 0.6 to 1.5, preferable 0.6 to 1.2, although wider ranges can be used in special cases. A preferred range is from 0.7 to 1.05 and a more preferred range is from 0.75 to 1.05.

The B-side of the present invention comprises an isocyanate-reactive component (ii) which includes any type of compound of those known in the art for that purpose, for example polyamines, aminoalcohols and polyols.

Suitable (polyether) polyols have been fully described in the prior art and include reaction products of alkylene oxides, for example ethylene oxide and/or propylene oxide, with initiators having a functionality of from 2 to 8, preferably 3 to 8, and an average hydroxyl number preferably from about 100 to 850, more preferably from about 200 to 750, and more preferably 200 to 650. The polyol or polyols may have a viscosity at 25° C. of at least about 500 cP, as measured according to ASTM D455. In some embodiments, a higher viscosity, of at least about 2,000 cP, may be preferable. Preferably, the polyol or polyols have an average molecular weight of from 100 to 10,000, more preferably of from 200 to 5,000.

Suitable initiators for the present invention include: polyols, for example ethylene glycol, diethylene glycol, propylene glycol, dipropylene glycol, butane diol, glycerol, trimethylolpropane, triethanolamine, pentaerythritol, sorbitol and sucrose; polyamines, for example ethylene diamine, tolylene diamine, diaminodiphenylmethane and polymethylene polyphenylene polyamines; and aminoalcohols, for example ethanolamine and diethanolamine; and mixtures of such initiators. Other suitable polyols include polyesters obtained by the condensation of appropriate proportions of glycols and higher functionality polyols with polycarboxylic acids. Still further suitable polyols include hydroxyl terminated polythioethers, polyamides, polyesteramides, polycarbonates, polyacetals, polyolefins and polysiloxanes. Still further suitable isocyanate-reactive components include ethylene glycol, diethylene glycol, propylene glycol, dipropylene glycol, butane diol, glycerol, trimethylolpropane, ethylene diamine, ethanolamine, diethanolamine, triethanolamine and the other initiators mentioned before. Mixtures of such isocyanate-reactive components may be used as well. Most preferably polyols are used which do not comprise primary, secondary or tertiary nitrogen atoms.

Of particular importance for the preparation of the rigid isocyanate-based polymer foams of the present invention are (polyether) polyols and polyol mixtures having a hydroxyl number of equal to or greater than 50, preferably equal to or greater than 80, more preferably equal to or greater than 100. Hydroxyl number indicates the number of reactive hydroxyl groups available for reaction. It is expressed as a number of milligrams of potassium hydroxide equivalent to the hydroxyl content of one gram of polyol. Of particular importance for the preparation of the rigid isocyanate-based polymer foams of the present invention are polyols and polyol mixtures having hydroxyl number of equal to or less than 1,200, preferably equal to or less than 1,000, more preferably equal to or less than 800.

Of particular importance for the preparation of the rigid foams are reaction products of alkylene oxides, for example ethylene oxide and/or propylene oxide, with initiators containing from 2 to 8 active hydrogen atoms per molecule. Suitable initiators include: polyols, for example ethylene glycol, diethylene glycol, propylene glycol, dipropylene glycol, butane diol, glycerol, trimethylolpropane, triethanolamine, pentaerythritol and sorbitol; polyamines, for example ethylene diamine, tolylene diamine, diaminodiphenylmethane and polymethylene polyphenylene polyamines; and aminoalcohols, for example ethanolamine and diethanolamine; and mixtures of such initiators. Other suitable polyols include polyesters obtained by the condensation of appropriate proportions of glycols and higher functionality polyols with polycarboxylic acids. Still further suitable polyols include hydroxyl terminated polythioethers, polyamides, polyesteramides, polycarbonates, polyacetals, polyolefins and polysiloxanes. Preferred polyols are the polyether polyols comprising ethylene oxide and/or propylene oxide units and most preferably polyoxyethylene polyoxypropylene polyols having an oxyethylene content of at least 10 percent and preferably 10 to 85 percent by weight. A preferred isocyanate-reactive component comprises an ethylene-oxide capped polyether polyol.

Other polyols which may be used comprise dispersions or solutions of addition or condensation polymers in polyols of the types described above. Such modified polyols, often referred to as "copolymer" polyols have been fully described in the prior art and include products obtained by the in situ polymerisation of one or more vinyl monomers, for example styrene and acrylonitrile, in polymeric polyols, for example polyether polyols, or by the in situ reaction between a polyisocyanate and an amino- or hydroxy-functional compound, such as triethanolamine, in a polymeric polyol.

The polymer modified polyols which are particularly interesting in accordance with the invention are products obtained by in situ polymerisation of styrene and/or acrylonitrile in polyoxyethylene polyoxypropylene polyols and products obtained by in situ reaction between a polyisocyanate and an amino or hydroxy-functional compound (such as triethanolamine) in a polyoxyethylene polyoxypropylene polyol.

Polyoxyalkylene polyols containing from 5 to 50 percent of dispersed polymer are particularly useful. Particle sizes of the dispersed polymer of less than 50 microns are preferred. Mixtures of such isocyanate-reactive components may be used as well. Most preferably polyols are used which do not comprise primary, secondary or tertiary nitrogen atoms.

The B-side further comprises a blowing agent (iii). In order to prepare a rigid isocyanate-based polymer foam of the present invention a blowing agent is required. Suitable blowing agents may be an organic blowing agent, an inorganic blowing agent, a chemical blowing agent, or mixtures thereof. For example, a wide variety of blowing agents can be used, including water; various hydrocarbons; various hydrofluorocarbons; various chlorofluorocarbons; gas like air, $N_2$ and $CO_2$; a variety of chemical blowing agents that produce nitrogen or carbon dioxide under the conditions of the foaming reaction; and the like. Combinations of these ways to make foams may be used as well.

Suitable physical blowing agents include carbon dioxide, nitrogen, argon, water, air, nitrogen, and helium. Physical blowing agents include aliphatic hydrocarbons having 1-9 carbon atoms and fully and partially halogenated aliphatic hydrocarbons having 1-4 carbon atoms. Aliphatic hydrocarbons include methane, ethane, propane, n-butane, isobutane, n-pentane, isopentane, neopentane, ethanol, dimethyl ether, and the like. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane, 1,1,1-trifluoroethane (HFC-143a), 1,1,1,2-tetrafluoroethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N-dimethyl-N,N'-dinitroso-terephthalamide, and trihydrazino triazine.

The amount of blowing agent may vary widely and primarily depends on the blowing agent used and the desired density of the rigid isocyanate-based polymer foam.

If water is used as a blowing agent, it is generally used in the range of from 0.1 to 5 parts by weight based on the weight of B-side.

If a hydrocarbon, hydrofluorocarbons, or a chlorofluorocarbon is used as a blowing agent, it is generally used in the range of from 5 to 30 parts by weight based on the weight of the B-side.

If a gas, such as air, $CO_2$, or $N_2$ is used as a blowing agent, it is generally used in the range of from 5 to 30 parts by weight based on the weight of the B-side.

In one embodiment of the present invention, a particularly desirable blowing agent is a combination of water and a hydrofluorocarbon.

The B-side may comprise one or more additional components (iv). As an additional component (iv), one or more catalyst may be present in the B-side of the reactive formulation of the present invention. One preferred type of catalyst is a tertiary amine catalyst. The tertiary amine catalyst may be any compound possessing catalytic activity for the reaction between a polyol and an organic polyisocyanate and at least one tertiary amine group. Representative tertiary amine catalysts include trimethylamine, triethylamine, dimethylethanolamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl) ether, bis(2-dimethylaminoethyl) ether, morpholine,4,4'-(oxydi-2,1-ethanediyl)bis, triethylenediamine, pentamethyl diethylene triamine, dimethyl cyclohexyl amine, N-acetyl N,N-dimethyl amine, N-coco-morpholine, N,N-dimethyl aminomethyl N-methyl ethanol amine, N,N,N'-trimethyl-N'-hydroxyethyl bis(aminoethyl) ether, N,N-bis(3-dimethylaminopropyl)N-isopropanolamine, (N,N-dimethyl)aminoethoxy ethanol, N,N,N',N'-tetramethyl hexane diamine, 1,8-diazabicyclo-5,4,0-undecene-7, N,N-dimorpholinodiethyl ether, N-methyl imidazole, dimethyl aminopropyl dipropanolamine, bis(dimethylaminopropyl)amino-2-propanol, tetramethylamino bis(propylamine), (dimethyl(aminoethoxyethyl))((dimethyl amine)ethyl)ether, tris(dimethylamino propyl)amine, dicyclohexyl methyl amine, bis(N,N-dimethyl-3-aminopropyl)amine, 1,2-ethylene piperidine and methyl-hydroxyethyl piperazine The B-side of the reactive formulation may contain one or more other catalysts, in addition to or instead of the tertiary amine catalyst mentioned before. Of particular interest among these are tin carboxylates and tetravalent tin compounds. Examples of these include stannous octoate, dibutyl tin diacetate, dibutyl tin dilaurate, dibutyl tin dimercaptide, dialkyl tin dialkylmercapto acids, dibutyl tin oxide, dimethyl tin dimercaptide, dimethyl tin diisooctylmercaptoacetate, and the like.

Catalysts are typically used in small amounts. For example, the total amount of catalyst used may be 0.0015 to 5 weight percent, preferably from 0.01 to 1 weight percent based on the total weight of the isocyanate-reactive compound (ii). Organometallic catalysts are typically used in amounts towards the low end of these ranges.

The B-side may further comprise as one of the additional components (iv) a crosslinker, which preferably is used, if at all, in small amounts, to 2 weight percent, up to 0.75 weight percent, or up to 0.5 weight percent based on the total weight of the isocyanate-reactive compound (ii). The crosslinker contains at least three isocyanate-reactive groups per molecule and has an equivalent weight, per isocyanate-reactive group, of from 30 to about 125 and preferably from 30 to 75. Aminoalcohols such as monoethanolamine, diethanolamine and triethanolamine are preferred types, although compounds such as glycerine, trimethylolpropane and pentaerythritol also can be used.

The B-side may further comprise a surfactant as an additional component (iv). A surfactant is preferably included in the foam formulation to help stabilize the foam as it expands and cures. Examples of surfactants include nonionic surfactants and wetting agents such as those prepared by the sequential addition of propylene oxide and then ethylene oxide to propylene glycol, solid or liquid organosilicones, and polyethylene glycol ethers of long chain alcohols. Ionic surfactants such as tertiary amine or alkanolamine salts of long chain alkyl acid sulfate esters, alkyl sulfonic esters and alkyl arylsulfonic acids can also be used. The surfactants prepared by the sequential addition of propylene oxide and then ethylene oxide to propylene glycol are preferred, as are the solid or liquid organosilicones. Examples of useful organosilicone surfactants include commercially available polysiloxane/polyether copolymers such as TEGOSTAB™ B-8729, and B-8719LF available from Goldschmidt Chemical Corp., and NIAX™ L2171 surfactant from Momentive Performance Materials. Non-hydrolyzable liquid organosilicones are more preferred. When a surfactant is used, it is typically present in an amount of 0.0015 to 1.5 weight percent based on the total weight of the organic isocyanate (i).

A chain extender may be employed as an additional component (iv) in the B-side of the reactive formulation of the present invention. A chain extender is a compound having exactly two isocyanate-reactive groups and an equivalent weight per isocyanate-reactive group of up to 499, preferably up to 250, also may be present. Chain extenders, if present at all, are usually used in small amounts, such as up to 10, preferably up to 5 and more preferably up to 2 weight percent based on the total weight of the isocyanate-reactive compound (ii). Examples of suitable chain extenders include ethylene glycol, diethylene glycol, triethylene glycol, propylene glycol, dipropylene glycol, tripropylene glycol, 1,4-dimethylolcyclohexane, 1,4-butane diol, 1,6-hexane diol, 1,3-propane diol, diethyltoluene diamine, amine-terminated polyethers such as JEFFAMINE™ D-400 from Huntsman Chemical Company, amino ethyl piperazine, 2-methyl piperazine, 1,5-diamino-3-methylpentane, isophorone diamine, ethylene diamine, hexane diamine, hydrazine, piperazine, mixtures thereof and the like.

The B-side may also comprise as an additional component (iv) a filler, which reduces overall cost, load bearing and other physical properties to the product. The filler may constitute up to about 50 percent, of the total weight of the polyurethane reactive formulation (i.e., the combined weight of the organic isocyanate (i), the isocyanate-reactive compound (ii), and the flame retardant component (iii)). Suitable fillers include talc, mica, montmorillonite, marble, barium sulfate (barytes), milled glass granite, milled glass, calcium carbonate, aluminum trihydrate, carbon, aramid, silica, silica-alumina, zirconia, talc, bentonite, antimony trioxide, kaolin, coal based fly ash and boron nitride.

The B-side may also comprise as an additional component (iv) a nucleating agent, which may be added in order to control the size of foam cells. Preferred nucleating agents include inorganic substances such as calcium carbonate, talc, clay, titanium oxide, silica, barium sulfate, diatomaceous earth, mixtures of citric acid and sodium bicarbonate, and the like. The amount of nucleating agent employed preferably ranges from about 0.01 to about 5 parts by weight per hundred parts by weight of a polymer resin. A more preferred range is from 0.1 to about 3 parts by weight.

In addition to the additional components listed herein above, the B-side may also comprise as an additional component (iv) selected from an infrared blocking agent (different from and in addition to component (C), flame retardants, for example phosphate type flame retardants, oil, antioxidant, mold release agent, matt agent, UV stabilizer, antistatic agent, antimicrobial, flow aid, processing aids, scratch or mar resistance agent, slip agents, antiblocking, pigments, thixotropic agent, flow enhancer, or a combination thereof. Each additive may be used in an amount typical for the type of additive in a rigid isocyanate-based polymer foam, said amounts are easily determined by one skilled in the art.

The reactive formulation which provides the rigid isocyanate-based polymer foam of the present invention further comprises a carbon black component (C), comprising a fluorinated carbon, preferably a fluorinated carbon black component (v). The fluorinated carbon may be wholly in the A-side, wholly in the B-side, partially in each side, preferably the fluorinated carbon is in the B-side. Fluorinated carbon (v), sometimes referred to as graphite fluoride or carbon fluoride, is a solid material resulting from the fluorination of carbon with elemental fluorine. The number of fluorine atoms per carbon atom may vary depending on the fluorination conditions. The variable fluorine atom to carbon atom stoichiometry of fluorinated carbon permits systematic, uniform variation of its electrical resistivity properties.

Fluorinated carbon, as used herein, is a specific class of compositions which is prepared by the chemical addition of fluorine to one or more of the many forms of solid carbon. In addition, the amount of fluorine can be varied in order to produce a specific, desired resistivity. Fluorocarbons are either aliphatic or aromatic organic compounds wherein one or more fluorine atoms have been attached to one or more carbon atoms to form well defined compounds with a single sharp melting point or boiling point. Fluoropolymers are linked-up single identical molecules which comprise long chains bound together by covalent bonds. Moreover, fluoroelastomers are a specific type of fluoropolymer. Thus, despite some apparent confusion in the art, it is apparent that fluorinated carbon is neither a fluorocarbon nor a fluoropolymer and the term is used in this context herein.

The fluorinated carbon material may be any of the fluorinated carbon materials as described herein. The methods for preparation of fluorinated carbon are well known and documented in the literature, such as in the following U.S. Pat. Nos. 2,786,874; 3,925,492; 3,925,263; 3,872,032 and 4,247,608, the disclosures of which are totally incorporated by reference herein. Essentially, fluorinated carbon is produced by heating a carbon source such as amorphous carbon, coke, charcoal, carbon black or graphite with elemental fluorine at elevated temperatures, typically between 150° C. to 600° C. A diluent such as nitrogen may preferably be admixed with the fluorine gas ($F_2$). The nature and properties of the fluorinated carbon vary with the particular carbon source, the conditions of reaction and with the degree of fluorination obtained in the final product. The degree of fluorination in the final product may be varied by changing the process reaction conditions, principally temperature and time. Generally, the higher the temperature and the longer the time, the higher the fluorine content.

Fluorinated carbon of varying carbon sources and varying fluorine contents is commercially available from several sources. Preferred carbon sources are carbon black, crystalline graphite and petroleum coke. One form of fluorinated carbon which is suitable for use in accordance with the invention is polycarbon monofluoride which is usually written in the shorthand manner $CF_x$ with x generally being up to about 1.5, preferably from about 0.01 to about 1.5, and particularly preferred from about 0.04 to about 1.4. $CF_x$ has a lamellar structure composed of layers of fused six carbon rings with fluorine atoms attached to the carbons and lying above and below the plane of the carbon atoms. Preparation of $CF_x$ type fluorinated carbon is described, for example, in above-mentioned U.S. Pat. Nos. 2,786,874 and 3,925,492. Generally, formation of this type of fluorinated carbon involves reacting elemental carbon with $F_2$ catalytically. This type of fluorinated carbon can be obtained commercially from many vendors, including Allied Signal, Morristown, N.J.; Central Glass International, Inc., White Plains, N.Y.; Diakin Industries, Inc., New York, N.Y.; Advanced Research Chemicals, Inc., Catoosa, Okla.; and Jiangsu Zhuoxi Fluorination Technology Co. Ltd., Taixing, China.

Another form of fluorinated carbon which is suitable for use in accordance with the invention is that which has been postulated by Nobuatsu Watanabe as poly(dicarbon monofluoride) which is usually written in the shorthand manner $(C_2F)_n$. Preparation of $(C_2F)_n$ type fluorinated carbon is described, for example, in above-mentioned U.S. Pat. No. 4,247,608, and also in Watanabe et al., "Preparation of Poly (dicarbon monofluoride) from Petroleum Coke", Bull. Chem. Soc. Japan, 55, 3197-3199 (1982).

In addition, preferred fluorinated carbons selected include those described in U.S. Pat. No. 4,524,119 to Luly et al., the subject matter of which is hereby incorporated by reference in its entirety, and those having the formula $CF_x$ and are formed by the reaction of $C+F_2=CF_x$.

A preferred fluorinated carbon is fluorinated carbon black. Carbon black fluorinated by surface treatment is most preferred. A preferred way to prepare fluorinated carbon black is to react carbon black in a 95 percent $F_2$ gas environment in an autoclave. For example, the $F_2$ pressure is kept at 3 bar initially, and reacted for 1 to 2 hours at a temperature between 500° C. to 600° C. Then, the pressure is released and temperature decreased to yield fluorinated carbon black. Different from fluoro chemical treatment, $F_2$ gas directly reacts with double bonds in the carbon black surface forming C—F bond on the surface. The resulting C—F bond is much more stable than fluoropolymer treatment by chemical reaction, which allows the C—F bond to survive under strong shearing in mixing processes.

The molar ratio of fluorine to carbon (F/C) in the fluorinated carbon black useful in the present invention is equal to or greater than 5/95, preferably equal to or greater than 10/90, more preferably equal to or greater than 12/88, more preferably equal to or greater than 20/80, and more preferably equal to or greater than 30/70. The molar ratio of fluorine to carbon (F/C) in the fluorinated carbon black useful in the present invention is equal to or less than 100/0, preferably equal to or less than 95/5, more preferably equal to or less than 90/10, more preferably equal to or less than 80/20, and more preferably equal to or less than 70/30, more preferably equal to or less than 60/40, more preferably equal to or less than 50/50, and more preferably equal to or less than 40/60.

In one embodiment of the present invention, the fluorinated carbon black has a fluorine to carbon (F/C) molar ratio of at least 10/90.

In one embodiment of the present invention, a preferable fluorinated carbon black has a fluorine to carbon (F/C) molar ratio of from 10/90 to 100/0.

In one embodiment of the present invention, a preferable fluorinated carbon black has a fluorine to carbon (F/C) molar ratio of from 12/88 to 60/40.

In one embodiment of the present invention, a preferable fluorinated carbon black has a fluorine to carbon (F/C) molar ratio of from 12/88 to 30/70.

In another embodiment, a preferable fluorinated carbon black has an average particle size of from 5 nanometers to 500 nanometers.

In addition to the fluorinated carbon black component (C) a non-fluorinated carbon (e.g., amorphous carbon, coke, charcoal, carbon black and/or graphite) may be present in the reactive formulation of the present invention such that the fluorinated carbon black to non-fluorinated carbon weight ration is equal to or greater than 50:50, in other words, the amount of fluorinated carbon black present in the reactive formulation of the present invention accounts for 50 weight percent or more of all the carbon present.

The fluorinated carbon is present in an amount of equal to or greater than 1 part, preferably in an amount equal to or greater than 1.5 parts, preferably in an amount equal to or greater than 2 parts, preferably in an amount equal to or greater than 2.5 parts, preferably in an amount equal to or greater than 3 parts, preferably in an amount equal to or greater than 4 parts, and more preferably in an amount equal to or greater than 5 parts, wherein parts are based on the weight of the B-side (not including (i.e., excluding) the weight of the fluorinated carbon black and/or carbon black if in the B-side). The fluorinated carbon is present in an amount of equal to or less than 8 parts, preferably in an amount equal to or less than 7 parts, and more preferably in an amount equal to or less than 6 parts, wherein parts are based on the weight of the B-side (not including (i.e., excluding) the weight of the fluorinated carbon black and/or carbon black if in the B-side).

Polyurethane foam formulations that contain a mixture of ethylene oxide-capped polypropylene oxides in accordance with the invention have been found to process well, especially in formulations in which mixture of water and a hydrofluorocarbon is used as the blowing agent. Good processing herein refers to the ability of a foam formulation to consistently produce good quality foam in an industrial setting. Good processing is indicated by consistently uniform cell structure, complete mold filling, consistently good surface appearance, consistent foam density and consistency in foam physical properties as the foam is produced over time. The foam formulation tolerates small changes in operating temperatures, catalyst levels and other process conditions which often cause significant product inconsistencies in other high water foam formulations.

The rigid isocyanate-based polymer foam of the present invention advantageously also has a density in the range of 25 to 45 kg/m$^3$, preferably from 30 to 40 kg/m$^3$. Density is conveniently measured according to ASTM D 3574.

The rigid isocyanate-based polymer foam may be closed cell or open cell depending upon the application. For most insulating applications, the present foam is desirably greater than 90 percent closed-cell according to ASTM D2856-A. A closed-cell structure substantially reduces convection effects, diffusion of insulating gas, and permeation of water vapor.

The rigid isocyanate-based polymer foam of the present invention advantageously has a k-factor that is equal to or less than 0.5 mW/mK, preferably equal to or less than 0.2 mW/mK, more preferably equal to or less than 0.1 mW/mK below the k-factor of a corresponding foam prepared from the same foam-forming composition except that the fluorinated carbon black is omitted.

To manufacture the rigid isocyanate-based polymer foam of the present invention, a reactive formulation is prepared, said reactive formulation comprising: an A-side comprising (i) one or more organic polyisocyanate and optionally all or part of the carbon black component (C) comprising a fluorinated carbon black component (v) (if component (C) is not all or partially in the A-side, it is all or partially in the B-side) and a B-side comprising (ii) one or more isocyanate-reactive component, (iii) a blowing agent; (iv) one or more additional component selected from a catalyst, a cell opener, a surfactant, a crosslinker, a chain extender, a flame retardant, a filler, a colorant, a pigment, an antistatic agent, reinforcing fibers, an antioxidant, a preservative, or an acid scavenger; and preferably all or part of the carbon black component (C) comprising a fluorinated carbon black component (v). The "B-side", is a premix comprising the appropriate amounts of polyol, optional fluorinated carbon black, blowing agent, catalyst, foaming aid, and other aids specific to the desired polyol component/final foam. Preferably, the B-side is mixed together at a temperature less than 40° C., more preferably it is mixed together at ambient temperature (defined herein as from 20° C. to 30° C.). The B-side is then mixed with the specific organic (poly)isocyanate component optionally containing part or all of the carbon black component (C) comprising the fluorinated carbon black (v), comprised in the "A-side" at the desired ratio, forming the reactive formulation which, when mixed, allows for the foaming reaction to occur. The polyol premix (B-side) and the organic polyisocyanate component (A-side) are mixed together by any known urethane foaming equipment. The resulting reactive formulation is subjected to conditions sufficient to cure the reactive formulation to form a rigid isocyanate-based polymer foam with improved thermal insulation properties. Note, the fluorinated carbon black component (v) is required in the reactive compositions of the present invention, in other words, component (v) is not an optional component, however, it may optionally be added wholly in the A-side, or optionally added wholly in the B-side, or optionally a portion can be added in the A-side and a portion may be added in the B-side.

The polyol premix (B-side) and the organic polyisocyanate component (A-side) are mixed together by any known urethane foaming equipment. The resulting reactive formulation is subjected to conditions sufficient to cure the reactive formulation to form a rigid polyurethane foam. The reactive formulation is either introduced into a suitable mold, so that a foaming/curing reaction takes place within the mold to form the desired polyurethane foam or it is allowed to foam/cure to form a slab stock or it is foamed in place.

The rigid isocyanate-based polymer foam of the present invention is particularly suited for use as an insulation material, for example in roofing, building wall panel, and appliance applications, especially ones such as refrigerators or freezers. The foam may be used alone and/or as a component in a composite structure. The foam provides insulation from heat and/or cold and may also serve to increase structural integrity and/or strength of such applications.

The rigid isocyanate-based polymer foam of the present invention may be produced by a discontinuous or a continuous process, with the foaming reaction and subsequent curing being carried out in a mold or on a conveyor. The foam product may be suitably produced as a foam composite or laminate by (a) contacting at least one substrate, such as a facing sheet with the reactive formulation (e.g., the form-forming mixture), and (b) foaming the mixture, preferably the foam is adhered to the substrate or facing sheet.

When the foam is a component of a composite structure, the foam is in contact with or adhered to at least one substrate which may be a layer or facing sheet of a rigid or elastic material such as paper for example Kraft paper, film, glass, chipboard, plastic including thermoplastic and thermoset plastic, metal sheeting for example aluminum, asphalt impregnated felts, glass fiber mats, as well as combinations of two or more of the above.

In some applications, such as refrigerators, freezers, hot water heaters, storage tanks, pipe in pipe, etc., the composite comprising the rigid polyurethane foam of the present invention is produced by injecting the foam-forming components of a rigid polyurethane, or the reactive formulation, into a cavity, this process is sometimes referred to pour-in-place. The cavity is typically a hollow structure with walls of metal or plastic. The metal or plastic comprising the walls is the substrate to which the foam is in contact with or the foam adheres to. The reactive formulation first fills the cavity and is then subjected to conditions which allow the complete foaming and curing reactions to occur resulting in the rigid polyurethane foam composite of the present invention. In such applications, e.g., pipe insulation, pour-in-place applications, or spray foam applications, the surface of the pipe, pour-in-place mold, or the material to which the spray is applied is the substrate of the composite of the present invention.

Said reactive formulation comprises an A-side comprising (i) an organic isocyanate, and a B-side comprising: (ii) an isocyanate-reactive component, (iii) a blowing agent, and (iv) one or more additional component selected from a catalyst, a nucleating agent, a surfactant, a cross linker, a chain extender, a flame retardant, a filler, a colorant, a pigment, an antistatic agent, reinforcing fibers, an antioxidant, a preservative, an infrared blocking agent, or an acid scavenger, and from 3 to 7 parts carbon black comprising (v) from 50 to 100 percent by weight of a fluorinated carbon black having a fluorine to carbon (F/C) molar ratio of at least 10/90, wherein parts by weight are based on the weight of the B-side component, and the carbon black component may be either wholly in the A-side, wholly in the B-side, or a portion in the A-side and a portion in the B-side. The reactive formulation may optionally have additional components typically used in rigid polyurethane compositions, such as a foaming agent, one or more catalyst, a surfactant, a cross linker, a chain extender, a flame retardant, a filler, a colorant, a pigment, an antistatic agent, reinforcing fibers, an antioxidant, a preservative, an infrared blocking agent, an acid scavenger, etc. The ingredients may be mixed together at temperatures from 0° C. to 150° C., preferably less than 40° C.

The fluorinated carbon black, or other solid additives such as Al flake, may either be mixed with polyol formulation before loading into a storage tank of a high/low pressure mixer (e.g., Cannon, Henneckle high pressure mixer). Alternatively, the carbon black, or other solid additives, may be mixed with the polyol (B-side) and the isocyanate (A-side) in a mixing chamber via a third stream; for this a high pressure mixer equipped with a three components mixing head is preferred, for example a Cannon FPL series mixing head. A more preferred method of the present invention is to use a high pressure mixer which injects the mixed reactants into a mold (e.g., refrigerator mold), and allows the reactants to fill, react, foam and cure in the cavity of mold, for further details see "Polyurethanes, Kunststoff-handbuch, Volume 7, $1^{st}$ ed. 1966".

The reactive formulation can be used for spray foam. The fluorinated carbon black can be well mixed with polyol or isocyanate and loaded into a reactant storage tank prior to injection foaming, then a spray gun type mixer can be used to spray the mixture on the substrate, for example the roof of building. The mixture then can be foamed as usual. An example equipment for this application is Graco Fusion CS series (Clear shot) equipment.

The process is advantageously conducted in a continuous manner by depositing the reactive formulation on a facing sheet(s) being conveyed along a production line. In a preferred embodiment, another facing sheet(s) is placed on the deposited mixture forming a sandwich structure with the foam in the middle. The deposited foam-forming mixture is conveniently thermally cured at a temperature from about 20° C. to 150° C. in a suitable apparatus, such as an oven or heated mold. Both free rise and restrained rise processes may be employed in the foam production, for example see U.S. Pat. No. 4,572,865, which is incorporated by reference herein in its entirety.

A preferred method of utilizing the above disclosed reactive formulation in the composite-forming process of the invention can be illustrated with reference to the apparatus shown in FIG. 1. The apparatus includes tanks 10, 11, and 12 for containing the foamable ingredients and additives such as surfactant, dye, blowing agent, etc. The tanks are charged with the foam-forming mixture in whatever manner is convenient and preferred for the given mixture. For example, in the production of an isocyanate-based foam, the foam-forming mixture can be divided into three liquid components, with the carbon black/polyisocyanate mixture, surfactant, and blowing agent in tank 10, the polyol in tank 11, and the catalyst in tank 12, each respectively connected to outlet lines 13, 14, and 15. The temperatures of the ingredients are controlled to ensure satisfactory processing. The lines 13, 14, and 15 form the inlet to metering pumps 16, 17, and 18. The apparatus is also provided with a storage tank (not shown) for a frothing agent. This tank discharges into conduit 19 which opens at "T"-intersection 20 into line 13. A check valve 21 and ball valve 22 in conduit 19 ensure no backup of material toward the frothing agent storage tank. The frothing agent instead can be introduced in the same way into line 14 or both lines 13 and 14. The pumps 16, 17, and 18 discharge respectively through lines 23, 24, and 25. Lines 24 and 25 comprise branches which open into line 26, and lines 23 and 26 are in turn respectively connected to flexible lines 27 and 28. The flexible lines 27 and 28 discharge to mixing head 29. The apparatus is also provided with a roll 30 of lower facing material 31, and a roll 30' of upper facing material 31'. Where only a lower facing material is used, the upper facing material can be replaced with a web coated with a release agent. The apparatus is also provided with metering rolls 32 and 33, and an oven 34 provided with vents 35 and 35' for introducing and circulating hot air. The apparatus also includes pull rolls 36 and 37, each of which preferably has a flexible outer sheath 38 and 39, and cutting means 40a for cutting off side excess material and 40b for severing the faced foam plastic produced into finite lengths, thereby producing discrete panels.

As an example of the operation, tank 10 is charged with the organic polyisocyanate/carbon black dispersion, blowing agent and surfactant, tank 11 is charged with the polyol, and tank 12 is charged with the catalyst composition. The speeds of the pumps 16, 17, and 18 are adjusted to give the desired ratios of the ingredients contained in the tanks 10 and 12, whereupon these ingredients pass respectively into lines 13, 14, and 15. When a froth-foaming process is conducted, the frothing agent is injected into line 13 upstream of metering pump 16. The ingredients pass through lines 23, 24, and 25, as well as lines 26, 27, and 28, whereupon they are mixed in the mixing head 29 and deposited therefrom. By virtue of rotation of the pull rolls 36 and 37, the lower facing material is pulled from the roll 30, whereas the upper facing material is pulled from the roll 30'. The facing material passes over idler rollers such as idler rollers 41 and 42 and is directed to the nip between the rotating metering rolls 32 and 33. The mixing head 29 is caused to move back and forth, i.e., out of the plane of the drawing by virtue of its mounting on a reciprocating means 43. In this manner, an even amount of material can be maintained upstream of the nip between the metering rolls 32 and 33. The composite structure at this point comprising lower and upper facing material 31 and 31' having therebetween a foamable mixture 44 now passes into the oven 34 and on along the generally horizontally extending conveyor.

While in the oven 34, the core expands under the influence of heat added by the hot air from vents 35 and 35' and due to the heat generated in the exothermic reaction between the polyol and isocyanate in the presence of the catalyst. The temperature within the oven is controlled by varying the temperature of the hot air from vents 35 and 35' in order to ensure that the temperature within the oven 34 is maintained within the desired limits of 40° C. to 150° F., and preferably 80° C. to 120° C. The foam, under the influence of the heat added to the oven, cures to form faced foam composite 45. The composite 45 then leaves the oven 34, passes between the pull rolls 36 and 37, and is cut by side edge and length cutting means 40a and 40b into finite lengths, thereby forming discrete panels 46 and 46' of the composite product.

Numerous modifications to the above-described apparatus will be immediately apparent to those skilled in the art, for example see U.S. Pat. No. 5,192,607 which is incorporated herein in its entirety. Any facing sheet previously employed to produce building panels can be employed in the present invention.

The rigid isocyanate-based polymer foam with improved thermal insulation properties of the present invention can be suitably used as a component to insulate a substrate, a facing sheet, a surface, or an enclosure forming a composite by applying to the substrate, facing sheet, surface, or enclosure directly or by applying an insulating panel comprising the present foam. Such applications include any insulating surfaces or enclosures such as houses, roofing, buildings, for example, the foamed mixture with one or more facing sheet(s) can be pasted, hung, or assembled as external panel of building for insulation purpose, refrigerators, freezers, appliances, piping, vehicles, and the like. Further, the present rigid isocyanate-based polymer foam of the present invention may be formed into a plurality of discrete foamed particles for conventional loose-fill cushioning and packaging applications, or may be ground into scrap for use as blown insulation.

Examples

In Examples 1 to 11 and Comparative Examples A to C, all B-side components are weighed into a plastic bottle and mixed at 4000 rpm for 20 minutes then subjected to 20 kHz ultrasonification 1-2 h to eliminate air bubbles in polyol mixture generated during mixing. If the fluorinated carbon black and/or non-treated carbon black are added to the B-side, they are weighed in the plastic bottle with the rest of the components. If the fluorinated carbon black is added in the A-side, it is added to the isocyanate over 30 minutes then mixed at 3000 rpm for 30 minutes. The resulting reactive formulations are processed into rigid polyurethane foam by mixing the A-side and B-side components with mixing at a head rotation speed at 3000 rpm for 6 seconds. The mixture is then poured into a closed 30 cm by 20 cm by 5 cm mold and allowed to foam. The mold is opened after 15 minutes and removed. Samples cut from the foam measuring 20 cm by 20 cm by 2.5 cm are allowed to equilibrate for 24 hours and measure the thermal conductivity at 23° C. (lower plate 36° C. and upper plate 10° C.) is determined. Free foams are made by mixing the A-side and B-side as herein above and adding the mixture to a 20 cm by 20 cm by 20 cm open mold to determine free foam, cream time, gel time and tack free time are recorded in seconds (s).

The materials used in Examples 1 to 11 and Comparative Examples A to C are summarized in Table 1. The amounts of the A-side (A), B-side (B-side), and fluorinated carbon and/or carbon (C) components for Examples 1 to 11 and Comparative Examples A to C are listed in Table 2. Unless otherwise indicated, in Table 2, amounts are in parts by weight with the amount of fluorinated carbon black and/or carbon black in parts by weight based on the total weight of the B-side.

Cream time (CT) which is the time when the foam starts rising from the liquid phase; at this point the liquid mixture become clearer due to bubble formation;

Gel time (GT) which is the time at which the foam mixture has developed enough internal strength to be dimensionally stable; it is recorded when the foam forms strings sticking to a metal spatula put and then withdrawn from the foam; and Tack free-time (TFT) which is the time at which the skin of the foam does not stick anymore to a glove covered finger when the foam is touched gently.

Free Rise Density and is determined using a free rise foam poured into a polyethylene bag placed in a wooden box. The reaction times (CT, GT, TFT) are determined. The foam should reach a height of about 25 to 30 cm. A foam sample is cut after 24 hours in a regular form; sample weight and volume are measure to calculate density.

K-factor is determined on foam samples cut from the core of the molded part (20 by 30 by 5 cm) into 20 by 20 by 2.5 cm foam plate 24 hours after foam production and these samples are used for testing immediately after cutting. Lambda, e.g., thermal conductivity or k-factor, is measured at 23° C. (average plate temperature) according to ISO 12939-01, using a heat flow meter instrument HC-074 by EKO Instrument Trading Co., Ltd.

Density is determined according to ASTM D941-88.

Viscosity is measured with an AR2000ex rotational rheometer from TA instrument; 40 mm parallel plates are used. The temperature is controlled at 25° C. by peltier plate. The shear rates are set from 0.1 to 100 S-1 within 10 minutes and the viscosity is recorded in 10 data points per decade.

TABLE 1

| Component | Grade Name | Characteristic | Supplier |
|---|---|---|---|
| Polyol-1 | RN482 | F = 6; OH no. = 482, PO based | The Dow Chemical Co. |
| Polyol-2 | V490 | F = 4.3; OH no. = 490, PO based | The Dow Chemical Co. |
| Polyol-3 | T5903 | F = 4; OH no. = 440, PO based | The Dow Chemical Co. |
| Polyol-4 | SD301 | F = 3; OH no. = 160, PO based | The Dow Chemical Co. |
| Catalyst-1 | PC-5 | Pentamethyl-diethylene triamine | Air Product |
| Catalyst-2 | PC-8 | N,N-dimethyl cyclohexylamine | Air Product |
| Catalyst-3 | PC-41 | 1,3,5-tris(3-(dimethylamino)propyl) hexahydro-s-triazine | Air Product |

TABLE 1-continued

| Component | Grade Name | Characteristic | Supplier |
|---|---|---|---|
| Surfactant | AK8850 | Silicone surfactant | Goldschmidt |
| Blowing agent-1 | $H_2O$ | Water | |
| Blowing agent-2 | HCFC-141b | 1,1-Dichloro-1-fluoroethane | Sanmei Zhejiang |
| Isocyanate | PAPI™-27 | PMDI | The Dow Chemical Co. |
| FCB | | F/C molar ratio = 5/95<br>F/C molar ratio = 12/88<br>F/C molar ratio = 30/70<br>F/C molar ratio = 60/40 | Jiangsu Zhuoxin fluorination technology Co., Ltd. |
| CB | | Untreated carbon black, particle size = 20 nm | Shanghai Furui Chemical Company |

F = functionality
OH no. = hydroxyl number
PO based = oxypropylene polyether polyol
FCB = fluorinated carbon black
F/C = fluorine to carbon molar ratio
CB = non-treated (i.e., fluorinated) carbon black Examples 12 and 13 and Comparative Examples D and E are large scale runs of some of the small scale formulations disclosed herein above. The compositions for Examples 12 and 13 and Comparative Examples D and E are as follows: Comparative Example D is the same as Comparative Example A above; Example 12 is the same as Example 1 above; Example 13 is the same as Example 10 above with the difference that all carbon black and fluorinated carbon black are loaded in the B-side and not the A-side; and Comparative Example E is the same as Comparative Example B above with the exception that the carbon black is loaded in the B-side and not the A-side. The compositions are formulated with a high pressure mixer made by Shenglong Machinery Company. The fluorinated carbon black is loaded into the isocyanate at specified amount, and a rotor stator made by BMT Company is used to disperse it at 3600 rpm 20 minutes on site prior to loading to reactant storage tank on high pressure mixer. The operating conditions and results are listed in Table 3.

From Table 3, the data shows that the reactive formulations of Examples 12 and 13 both demonstrate improved and consistent foam k-factors as compared to the foam mixture Comparative Example D, with no fluorinated carbon black, which yielded a foam k-factor of 18.36 and 18.39 mW/mK. Further, Comparative Example E comprising untreated carbon black demonstrated poor dispersion of the carbon black which resulted in an inconsistent or variable foam k-factor.

TABLE 2

| | Comparative Example | | | Example | | | |
|---|---|---|---|---|---|---|---|
| | A | B | C | 1 | 2 | 3 | 4 |
| COMPONENT | | | | | | | |
| Polyol-1 | 22.01 | 22.01 | 22.01 | 22.01 | 22.01 | 22.01 | 22.01 |
| Polyol-2 | 22.01 | 22.01 | 22.01 | 22.01 | 22.01 | 22.01 | 22.01 |
| Polyol-3 | 22.01 | 22.01 | 22.01 | 22.01 | 22.01 | 22.01 | 22.01 |
| Polyol-4 | 7.33 | 7.33 | 7.33 | 7.33 | 7.33 | 7.33 | 7.33 |
| Catalyst-1 | 0.37 | 0.37 | 0.37 | 0.37 | 0.37 | 0.37 | 0.37 |
| Catalyst-2 | 1.10 | 1.1 | 1.1 | 1.10 | 1.1 | 1.10 | 1.10 |
| Catalyst-3 | 0.52 | 0.52 | 0.52 | 0.52 | 0.52 | 0.52 | 0.52 |
| Surfactant | 1.47 | 1.47 | 1.47 | 1.47 | 1.47 | 1.47 | 1.47 |

TABLE 2-continued

|  |  |  |  |  |  |  |  |  |
|---|---|---|---|---|---|---|---|---|
| BA-1 |  | 1.62 | 1.62 | 1.62 | 1.62 | 1.62 | 1.62 | 1.62 |
| BA-2 |  | 21.57 | 21.57 | 21.57 | 21.57 | 21.57 | 21.57 | 21.57 |
| Isocyanate |  | 116 | 116 | 116 | 116 | 116 | 116 | 116 |
| CB | A-side |  | 5 |  |  |  |  |  |
| FBC, F/C = 5/95 | B-side |  |  | 5 |  |  |  |  |
| FBC, F/C = 12/88 | B-side |  |  |  | 5 |  |  |  |
| FBC, F/C = 12/88 | A-side |  |  |  |  | 5 |  |  |
| FBC, F/C = 30/70 | B-side |  |  |  |  |  | 5 |  |
| FBC, F/C = 60/40 | B-side |  |  |  |  |  |  | 5 |
| PROPERTIES |  |  |  |  |  |  |  |  |
| Gel time | s | 45 | 46 | 46 | 46 | 45 | 47 | 47 |
| k-factor at 23° C. | mW/mK | 18.43 | 18.36 | 18.31 | 17.55 | 18.03 | 18.03 | 18.22 |
| density | Kg/cm³ | 39 | 39.2 | 38.2 | 37.3 | 37.3 | 38.7 | 37.2 |
| Viscosity (1 s−1) | mPa-s |  | 161000 |  | 20420 | 10300 |  |  |
| Viscosity (10 s−1) | mPa-s |  | 27650 |  | 5280 | 2140 |  |  |
| Viscosity (100 s−1) | mPa-s |  | 11730 |  | 3140 | 890 |  |  |

|  |  | Example | | | | | | |
|---|---|---|---|---|---|---|---|---|
|  |  | 5 | 6 | 7 | 8 | 9 | 10 | 11 |
| COMPONENT |  |  |  |  |  |  |  |  |
| Polyol-1 |  | 22.01 | 22.01 | 22.01 | 22.01 | 22.01 | 22.01 | 22.01 |
| Polyol-2 |  | 22.01 | 22.01 | 22.01 | 22.01 | 22.01 | 22.01 | 22.01 |
| Polyol-3 |  | 22.01 | 22.01 | 22.01 | 22.01 | 22.01 | 22.01 | 22.01 |
| Polyol-4 |  | 7.33 | 7.33 | 7.33 | 7.33 | 7.33 | 7.33 | 7.33 |
| Catalyst-1 |  | 0.37 | 0.37 | 0.37 | 0.37 | 0.37 | 0.37 | 0.37 |
| Catalyst-2 |  | 1.1 | 1.10 | 1.10 | 1.1 | 1.10 | 1.10 | 1.10 |
| Catalyst-3 |  | 0.52 | 0.52 | 0.52 | 0.52 | 0.52 | 0.52 | 0.52 |
| Surfactant |  | 1.47 | 1.47 | 1.47 | 1.47 | 1.47 | 1.47 | 1.47 |
| BA-1 |  | 1.62 | 1.62 | 1.62 | 1.62 | 1.62 | 1.62 | 1.62 |
| BA-2 |  | 21.57 | 21.57 | 21.57 | 21.57 | 21.57 | 21.57 | 21.57 |
| Isocyanate |  | 116 | 116 | 116 | 116 | 116 | 116 | 116 |
| CB | A-side |  |  |  |  | 2.5 | 2 | 1 |
| FBC, F/C = 5/95 | B-side |  |  |  |  |  |  |  |
| FBC, F/C = 12/88 | B-side | 3 | 4 | 6 | 7 |  |  |  |
| FBC, F/C = 12/88 | A-side |  |  |  |  | 2.5 | 3 | 4 |
| FBC, F/C = 30/70 | B-side |  |  |  |  |  |  |  |
| FBC, F/C = 60/40 | B-side |  |  |  |  |  |  |  |
| PROPERTIES |  |  |  |  |  |  |  |  |
| Gel time | s | 46 | 44 | 44 | 47 | 47 | 45 | 47 |
| k-factor at 23° C. | mW/mK | 18.21 | 17.99 | 17.90 | 17.75 | 18.16 | 17.85 | 17.97 |
| density | Kg/cm³ | 36.9 | 37.4 | 37 | 34.5 | 37.6 | 37 | 36.7 |
| Viscosity (1 s−1) | mPa-s |  |  |  |  |  |  |  |
| Viscosity (10 s−1) | mPa-s |  |  |  |  |  |  |  |
| Viscosity (100 s−1) | mPa-s |  |  |  |  |  |  |  |

TABLE 3

| Comparative Example | Example | Mold, mm | Temperature, ° C. | Injection Pressure, MPa | Cream time/gel time/touch free time, s | K-factor @ 23° C., mW/Mk | Density, kg/m³ |
|---|---|---|---|---|---|---|---|
| D |  | 30 × 20 × 5 | 23 | 12 | 7/49/61 | 18.36 | 35.9 |
|  |  |  |  |  |  | 18.39 | 34 |
|  | 12 | 30 × 20 × 5 | 23 | 12 | 6/45/61 | 17.73 | 35.2 |
|  |  |  |  |  |  | 17.71 | 35.9 |
|  | 13 | 30 × 20 × 5 | 23 | 12 | 6/43/68 | 17.48 | 33.2 |
|  |  |  |  |  |  | 17.79 | 35 |
| E |  | 30 × 20 × 5 | 23 | 12 | 6/42/60 | 18.12 | 35.1 |
|  |  |  |  |  |  | 17.73 | 34.9 |

The invention claimed is:

1. A method to insulate a surface or an enclosure by applying to the surface or enclosure a composite comprising at least one substrate in contact with a rigid polyurethane foam made from a reactive formulation comprising a mixture of:
   (A) an A-side comprising
      (i) an organic isocyanate comprising 2,4'-diphenylmethane diisocyanate (MDI), 2,2'-diphenylmethane diisocyanate, 4,4'-diphenylmethane diisocyanate, or mixtures thereof,
   (B) a B-side comprising:
      (ii) an isocyanate-reactive component,
      (iii) a blowing agent,
      and
      (iv) one or more additional component selected from a catalyst, a nucleating agent, a surfactant, a crosslinker, a chain extender, a flame retardant, a filler, a colorant, a pigment, an antistatic agent, reinforcing fibers, an antioxidant, a preservative, an infrared blocking agent, or an acid scavenger, and (C) from 3 to 7 parts carbon black comprising (v) from 50 to 100 percent by weight of a fluorinated carbon black having a fluorine to carbon (F/C) molar ratio of at least 10/90, wherein parts by weight are based on 100 parts by weight of the B-side component (B) and component (C) may be either wholly in the A-side (A), wholly in the B-side (B), or a portion in the A-side and a portion in the B-side wherein said polyurethane foam is greater than 90 percent closed-cell according to ASTM D2856-A.

2. The method of claim 1 wherein the organic isocyanate further comprises 2,4-toluene diisocyanate (TDI), 2,6-toluene diisocyanate, or mixtures thereof; mixtures of diphenylmethane diisocyanates and oligomers thereof having an isocyanate functionality greater than 2; or MDI comprising urethane, allophanate, urea, biuret, carbodiimide, uretonimine and/or isocyanurate groups.

3. The method of claim 1 wherein the isocyanate-reactive component is a polyether polyol having a functionality of from 2 to 8 and a hydroxyl number of from 100 and 850.

4. The method of claim 1 wherein the blowing agent is a physical blowing agent, a chemical blowing agent, or mixture thereof.

5. The method of claim 1 wherein the carbon black component (C) is 100 percent fluorinated carbon black (v).

6. The method of claim 1 wherein the fluorinated carbon black has an average particle size of from 5 nm to 500 nm.

7. The method of claim 1 wherein said foam has a k-factor determined according to ISO 12939-01 such that the k-factor of the foam is at least 0.2 mW/mK below the k-factor of a corresponding foam prepared from the same foam-forming composition except that the fluorinated carbon black is omitted.

8. The method of claim 1 wherein the surface or enclosure is a house, a roof, a building, a refrigerator, a freezer, an appliance, a pipe, or a vehicle.

* * * * *